Patented Oct. 27, 1942

2,300,038

UNITED STATES PATENT OFFICE 2,300,038

MEANS FOR TEACHING TELEGRAPHY

Gilbert M. Wright, Los Angeles, Calif.

No Drawing. Application September 9, 1940,
Serial No. 356,037

5 Claims. (Cl. 35—14)

This invention pertains to improved means of teaching and is particularly directed towards means which permit students to more readily establish the memory of certain sounds and to recognize and translate such sounds into phonetically understandable counterparts. Differently stated, the invention pertains to a method which employs reproducible sound records carrying sounds having a significance in one mode of expression, said sounds being correlated with other sounds having an understandable significance in a different form of expression so that the correlation is readily appreciated by the student. The method is applied to the teaching of telegraphy whereby the students are caused to identify the various pulsations of sound corresponding to the various letters of the alphabet and associate such pulsations with the proper voice sound of the corresponding letter.

In telegraphy, each letter, numeral or integer is represented by a group of pulsations of electrical energy, such pulsations being then transmitted either over a suitable conductor or by radio waves or high frequency. Each group of pulsations consists of dots and dashes, the dots being short pulses of current and the dashes being longer pulses of current.

The present invention is directed to any system of signaling or telegraphy which employs or depends upon the duration, spacing or absence of sound pulses. The Morse code is the classical example of such systems of signaling and there are many adaptations of the Morse code such as, for example, the so-called American code, International code, and others in which each group of pulsations arbitrarily represents a given figure, letter, word or phase. The code may be said to be a form of expression, each group of pulsations having a certain significance.

Students of telegraphy and allied methods of signaling need go through a long training period in order to familiarize themselves with each dot-dash-space group corresponding to a letter, figure or word. The sending key and receiving instrument ordinarily include a buzzer or sounder which permits the pulsations or interruptions in the current to be audibly impressed and received by the sender and/or receiver of the message. This buzzer or sounder generally emits a substantially uniform sound interrupted into the dots and dashes which form the groups correlated to and representing a given figure, letter or word. To the layman or beginner, these groups of interrupted sound have no meaning and difficulty is experienced in rapidly teaching the correlation between such groups of interrupted sound and the correlated letters, words or figures.

An object of the present invention is to facilitate the correlation of the groups of interrupted sound and the corresponding letters, figures or words.

An object of the present invention is to disclose and provide a reproducible sound record carrying audible sounds arranged in the form of code pulsations, such sounds or pulsations being modified sufficiently to be phonetically recognizable as a letter or numeral, so that when the record is reproduced there is heard the combined effect of the code signal and the corresponding letter or numeral.

Generally stated, the invention comprises a record made by superimposing phonetically recognizable modulations upon each group of interrupted sounds of a Morse, International or other code system (or other form of expression), said modulations being recognizable as a letter, figure or word corresponding to the pulsations.

A previously stated, the Morse code is a signaling method whereby each letter or figure is composed of a group of dots and dashes. The dot is a short signal ordinarily lasting about $\frac{1}{24}$ second; the dash is a longer signal, lasting about $\frac{3}{24}$ second. The dot is called a unit and certain letters, such as the letters T and L composed only of a dash, distinguish from each other by the length of the dash, T being generally three units long whereas L is five units long. The three unit dash is employed in groups in which both dots and dashes occur, as for example in U, which is represented by two dots and a dash.

In accordance with the present invention, sound recordings are prepared, such sound recordings comprising a series of pulsations of audible sound, the pulsations being arranged in code groups. In other words, the sound record is a record of a code message, the alphabet, or the like. An elementary form of recording for use in teaching Morse code signaling is a sound record carrying the letters of the alphabet in ordinary sequence, each letter being spaced from the other. Each group of pulsations, however, is not of a uniform or constant frequency such as is ordinarily emitted by a telegraph key or sounder. Instead, the sound record referred to and each group of pulsations carried thereby includes a phonetic representation of such group of pulsations, the record thereby including the voice sound of the corresponding letter of the alphabet.

In Morse code the letter A is represented by a dot followed by a dash. Ordinarily the sound emitted by a telegraph key in sending or receiving this letter may be represented as "zz zzzzzz." The sound will be of uniform frequency and pitch. In accordance with the present invention, a modulation is imposed upon this carrier sound or pitch and as a result, the sound recording when reproduced may be said to sound as follows: "aa aaaaaa."

The student hearing a sound recording carrying the modified pulsations described hereinabove is able to immediately correlate the letter "a" with a group consisting of a dot and a dash, thereby making it unnecessary for him to independently remember that a dot-dash group represents the letter "a."

Sound recordings for use in teaching signaling in accordance with the present invention may be made in a number of different ways. The most effective method known to applicant is disclosed in his United States Patent No. 2,273,078 issued February 17, 1942, and entitled "Means and methods for producing sound effects." The adaptation of the method described in the aforesaid application to the making of a record of the present invention involves mechanically applying vibrations of audible and substantially constant frequency to the skin of a human in the region of the throat, interrupting the supply of such vibrations in accordance with code, the vibrations then constituting groups of pulsations representing the desired words, letters or figures, transmitting said interrupted vibrations through the skin to cause the air within the vocal cavities to vibrate, modulating the sound waves thus generated within the vocal cavities into phonetically understandable counterparts of the code (such modulation being done with the physical elements such as lips and tongue of the vocal cavity, and generally without the use of vocal cords of the human) and recording the sound waves thus modulated. Records thus made consist of the carrier wave or buzzer or the like, modulated or varied in resonance and pitch by the lips and tongue of the human into a sound which is recognizable as a voice sound of that letter, figure or word represented by the code. The characteristic code symbol sound has therefore been articulated into the word or letter which the pulsations represent and the novice being taught telegraphy will now hear the actual phonetic sound of the pulsations and thereby more readily establish the memory of pulsations in terms of phonetically understandable sounds. The present invention thereby offers a means of greatly increasing the speed and ease of learning to recognize and to translate code or telegraphic sounds so that an entire message could be reproduced and one entirely unfamiliar with the code could keep it readily in the form of letters, words and figures.

Obviously, instead of using any electrically produced sound as the carrier, other sounds such as drum beats, diaphragm pulsations, horn pulsations, etc., could be employed as carrier waves. All such fairly uniform sounds are hereinafter referred to as sounds of substantially uniform frequency. During the modulation of the sound waves into phonetrically understandable counterparts as hereinbefore described, the pitch and overtones of such carrier frequency are changed to impart thereto the phonetically understandable characteristics.

Another method of producing sound recordings involves simultaneously voicing the dots and dashes of each group of pulsations and imparting to such dots and dashes the sound of the corresponding letter and actuating a buzzer key to produce the customary sound of the key in the form on dots and dashes. These two sounds may then be combined into a single recording channel, the amplitude of each of the sound sources being suitably modified by attenuating means, and recording the two sounds upon a single record. The amplitude of the buzzer may thus be varied in any desired manner. Similarly, the amplitude of the articulated sound may be varied.

A still further method for making a suitable record may comprise voicing the dots and dashes and superimposing on such voice a standard buzzer sound. The buzzer sound may be continuous and its supply to the recording channel may be controlled by a key operated by a direct current component of the voice record. Electrical means for accomplishing this result are known in the sound recording art, one form of arrangement being shown in Patent No. 1,888,467.

Sound recordings made as described herein are then reproduced in classrooms and the students are permitted to familiarize themselves with the code and to read the same by hearing the recordings reproduced. As the course of instruction proceeds, the phonetic representation superimposed upon the carrier frequency or buzzer may be reduced in intensity until the recordings reproduced for the benefit of the students consist solely of the dots and dashes and interrupted pulsations of a standard sending or receiving key and do not include the phonetically recognizable counterparts. All changes and modifications coming within the scope of the appended claims are embraced thereby.

I claim:

1. A sound record for use in teaching Morse code and the like, said sound record comprising groups of code pulsations representing letters of the alphabet, each group of code pulsations having superimposed thereon the voice sound of the corresponding letter.

2. A sound record for use in teaching Morse code and the like, said sound record carrying audible sounds arranged in code groups, the sound of each code group being modified sufficiently to be phonetically recognizable as a letter of the alphabet expressed in pulsations of code.

3. A sound record for teaching Morse code and the like, comprising a sound recording of a fundamental substantially uniform frequency arranged in the form of code pulsations, said frequency being modified sufficiently to form phonetically understandable sound counterparts of the code pulsations when said sound recording is reproduced.

4. A sound record for use in teaching Morse code and the like, said sound record comprising audible sounds arranged in the form of code pulsations, the sound of each code pulsation being modified sufficiently to be phonetically recognizable as a letter or numeral.

5. A sound record for use in teaching Morse code and like codes, comprising a sound recording of an audible tone arranged in the form of code, the tone being modified to be phonetically recognizable as a letter or numeral, whereby on reproduction the combined effect of the code signal and the corresponding letter or numeral is heard.

GILBERT M. WRIGHT.